(12) United States Patent
Chen et al.

(10) Patent No.: US 12,503,610 B2
(45) Date of Patent: Dec. 23, 2025

(54) ANTIFOULING COATING AND USE METHOD AND USE THEREOF

(71) Applicant: HARBIN ENGINEERING UNIVERSITY, Heilongjiang (CN)

(72) Inventors: Rongrong Chen, Heilongjiang (CN); Shurui Zhang, Heilongjiang (CN); Jun Wang, Heilongjiang (CN); Jiahui Zhu, Heilongjiang (CN); Jingyuan Liu, Heilongjiang (CN); Jing Yu, Heilongjiang (CN); Qi Liu, Heilongjiang (CN); Haotian Wang, Heilongjiang (CN); Peili Liu, Heilongjiang (CN)

(73) Assignee: HARBIN ENGINEERING UNIVERSITY, Heilongjiang (CN)

( * ) Notice: Subject to any disclaimer, the term of this patent is extended or adjusted under 35 U.S.C. 154(b) by 62 days.

(21) Appl. No.: 18/027,853

(22) PCT Filed: Sep. 6, 2022

(86) PCT No.: PCT/CN2022/117145
§ 371 (c)(1),
(2) Date: Mar. 22, 2023

(87) PCT Pub. No.: WO2023/087854
PCT Pub. Date: May 25, 2023

(65) Prior Publication Data
US 2024/0309225 A1    Sep. 19, 2024

(30) Foreign Application Priority Data

Nov. 16, 2021  (CN) .......................... 202111357156.1

(51) Int. Cl.
*C09D 5/16* (2006.01)
*C08G 18/10* (2006.01)
*C08G 18/60* (2006.01)
*C08G 18/61* (2006.01)
*C08G 18/75* (2006.01)
*C09D 175/02* (2006.01)
*C09D 175/04* (2006.01)
*C09D 175/08* (2006.01)

(52) U.S. Cl.
CPC ........... *C09D 5/1675* (2013.01); *C08G 18/10* (2013.01); *C08G 18/603* (2013.01); *C08G 18/61* (2013.01); *C08G 18/755* (2013.01); *C09D 175/02* (2013.01); *C09D 175/04* (2013.01); *C09D 175/08* (2013.01)

(58) Field of Classification Search
None
See application file for complete search history.

(56) References Cited

U.S. PATENT DOCUMENTS

2011/0003913 A1*  1/2011  Duijghuisen ........ C09D 175/04
                                              523/435

* cited by examiner

*Primary Examiner* — Christopher M Rodd
(74) *Attorney, Agent, or Firm* — Nolte Lackenbach Siegel

(57) ABSTRACT

The present disclosure provides an antifouling coating and a use method and use thereof. In the antifouling coating of the present disclosure, polyaspartic acid ester is an isocyanate curing agent containing a secondary amine structure. An ester group and aliphatic properties in the polyaspartic acid ester can increase wear resistance of the coating. The polyaspartic acid ester is combined with a polyisocyanate-containing prepolymer in a component A to endow the antifouling coating with desirable toughness and elasticity, such that the antifouling coating has excellent impact and abrasion resistance. In the component A, a polydimethylsiloxane structure is introduced into the hydroxypropyl silicone oil-based isocyanate prepolymer. The polydimethylsiloxane structure can generate microphase separation with a polyurea hard segment and migrate to a surface of the coating, thereby reducing surface energy of the coating to reduce an adhesion between fouling organisms and an interface.

20 Claims, No Drawings

ANTIFOULING COATING AND USE METHOD AND USE THEREOF

CROSS REFERENCE TO RELATED APPLICATION

The present application claims priority to Chinese Patent Application No. 202111357156.1 filed to the China National Intellectual Property Administration (CNIPA) on Nov. 16, 2021 and entitled "ANTIFOULING COATING AND USE METHOD AND USE THEREOF", which is incorporated herein by reference in its entirety.

TECHNICAL FIELD

The present disclosure relates to the technical field of marine antifouling coatings, in particular to an antifouling coating and a use method and use thereof.

BACKGROUND

Marine biofouling is highly harmful to man-made structures, such as large ships, cross-sea bridges, and submarine pipelines, causing a huge impact on the development of marine industry. Marine antifouling coatings can reduce the attachment of fouling organisms. However, traditional antifouling coatings contain a large amount of heavy metal ions or other toxic substances, leading to increasingly serious marine environmental and ecological problems.

At present, relatively environmental-friendly antifouling coatings on the market include mainly self-polishing antifouling coatings and fouling-releasing antifouling coatings. The self-polishing antifouling coating uses zinc acrylate, copper acrylate, and silyl acrylate copolymer resin as a matrix resin, and includes an antifouling agent such as cuprous oxide, copper pyrithione, zinc pyrithione, and zineb, a filler such as zinc oxide and titanium dioxide, and an anti-settling agent. The self-polishing antifouling coating is generally a single-component coating. The self-polishing antifouling coating inhibits the adhesion of fouling organisms by releasing the antifouling agent through continuous surface self-renewal, while the release of the antifouling agent also affects the environmental protection property, wear resistance, and cleaning resistance of the self-polishing antifouling coating. The fouling-releasing antifouling coating is a two-component or three-component coating, using modified silicone rubber as a matrix resin, and includes a filler such as silicon dioxide. Fouling-releasing antifouling coatings are environmental-friendly and have weak adhesion to biological surfaces; however, the fouling-releasing antifouling coatings have abrasion resistance that needs to be improved.

SUMMARY

In view of this, an objective of the present disclosure is to provide an antifouling coating and a use method and use thereof. A coating formed by the antifouling coating has excellent abrasion resistance.

To achieve the above objective, the present disclosure provides the following technical solutions.

The present disclosure provides an antifouling coating, including a component A and a component B that are separately packaged; where the component A includes an isocyanate prepolymer; and the isocyanate prepolymer includes a polypropylene glycol (PPG)-based isocyanate prepolymer and a hydroxypropyl silicone oil-based isocyanate prepolymer;

the component B includes the following raw materials in parts by weight: 30 parts to 50 parts of polyaspartic acid ester and 1.5 parts to 4 parts of a polyaspartic acid powder; and the component A and the component B have a weight ratio of (58-96):(31.6-54.2).

Preferably, a preparation method of the PPG-based isocyanate prepolymer includes the following steps:

mixing PPG with isophorone diisocyanate (IPDI) to conduct first prepolymerization to obtain the PPG-based isocyanate prepolymer; where the PPG and the IPDI have a mass ratio of (180-300):(65.1-137.9); and the PPG has a weight-average molecular weight of 2,000 to 3,000.

Preferably, the first prepolymerization is conducted at 80° C. to 85° C. for 2 h to 3 h.

Preferably, a preparation method of the hydroxypropyl silicone oil-based isocyanate prepolymer includes the following steps:

mixing hydroxypropyl silicone oil with IPDI to conduct second prepolymerization to obtain the hydroxypropyl silicone oil-based isocyanate prepolymer; where the hydroxypropyl silicone oil and the IPDI have a mass ratio of (160-220):(65.4-112.4); and the hydroxypropyl silicone oil has a weight-average molecular weight of 1,000 to 2,000.

Preferably, the second prepolymerization is conducted at 80° C. to 85° C. for 2 h to 3 h.

Preferably, the PPG-based isocyanate prepolymer and the hydroxypropyl silicone oil-based isocyanate prepolymer have a mass ratio of (6-10):(0-4), and the hydroxypropyl silicone oil-based isocyanate prepolymer has a mass of not 0.

Preferably, the polyaspartic acid powder has a weight-average molecular weight of 2,000 to 5,000.

Preferably, the component B further includes a catalyst, and the catalyst is one or more selected from the group consisting of dibutyltin dilaurate, triethylamine, and zinc naphthenate.

The present disclosure further provides a use method of the antifouling coating, including the following steps:

mixing the component A with the component B to obtain the antifouling coating; and coating the antifouling coating on a substrate and conducting curing.

The present disclosure further provides use of the antifouling coating in the field of marine antifouling.

The present disclosure provides an antifouling coating, including a component A and a component B that are separately packaged; where the component A includes an isocyanate prepolymer; and the isocyanate prepolymer includes a PPG-based isocyanate prepolymer and a hydroxypropyl silicone oil-based isocyanate prepolymer; the component B includes the following raw materials in parts by weight: 30 parts to 50 parts of polyaspartic acid ester and 1.5 parts to 4 parts of a polyaspartic acid powder; and the component A and the component B have a weight ratio of (58-96):(31.6-54.2). In the antifouling coating provided by the present disclosure, polyaspartic acid ester is an isocyanate curing agent containing a secondary amine structure. An ester group and aliphatic properties in the polyaspartic acid ester can increase wear resistance of the coating. The polyaspartic acid ester is combined with an isocyanate prepolymer in a component A to endow the antifouling coating with desirable toughness and elasticity, such that the antifouling coating has excellent impact and abrasion resistance. In the component A, a polydimethylsiloxane structure is introduced into the hydroxypropyl silicone oil-based isocyanate prepolymer. The polydimethylsiloxane structure can generate microphase separation with a polyurea hard segment and migrate to a surface of the coating, thereby reducing surface energy of the coating to reduce an adhesion between fouling organisms and an interface. A urea-based structure and redundant isocyanate groups that migrate to a bottom can increase the adhesion of the coating through hydrogen bonding and chemical bonding, ensuring cleaning and abrasion resistance. The polyaspartic acid powder, as a polymer of aspartic acid, is negatively charged in a seawater environment, and can be released into seawater to interfere with the adhesion behavior of fouling organisms; meanwhile, the polyaspartic acid powder is natural and environmental-friendly, and does not cause harm to the marine environment.

DETAILED DESCRIPTION OF THE EMBODIMENTS

The present disclosure provides an antifouling coating, including a component A and a component B that are separately packaged; where
the component A includes an isocyanate prepolymer; and the isocyanate prepolymer includes a PPG-based isocyanate prepolymer and a hydroxypropyl silicone oil-based isocyanate prepolymer;
the component B includes the following raw materials in parts by weight: 30 parts to 50 parts of polyaspartic acid ester and 1.5 parts to 4 parts of a polyaspartic acid powder; and
the component A and the component B have a weight ratio of (58-96):(31.6-54.2).

In the present disclosure, the raw materials provided herein are all preferably commercially-available products unless otherwise specified.

In the present disclosure, the antifouling coating includes a component A; the component A includes an isocyanate prepolymer; and the isocyanate prepolymer includes a PPG-based isocyanate prepolymer and a hydroxypropyl silicone oil-based isocyanate prepolymer.

In the present disclosure, a preparation method of the PPG-based isocyanate prepolymer includes preferably the following steps:
mixing PPG with IPDI to conduct first prepolymerization to obtain the PPG-based isocyanate prepolymer.

In the present disclosure, the PPG has a weight-average molecular weight of preferably 2,000 to 3,000. The PPG and the IPDI have a mass ratio of preferably (180-300):(65.1-137.9), more preferably 240:110.

In the present disclosure, the IPDI is preferably added dropwise at preferably 1.2 mL/min to 2.4 mL/min. The IPDI is preferably added dropwise under stirring and heating the PPG at preferably 50° C.±5° C.

In the present disclosure, the first prepolymerization is conducted at preferably 80° C. to 85° C. for preferably 2 h to 3 h, more preferably 2.5 h.

In the present disclosure, a preparation method of the hydroxypropyl silicone oil-based isocyanate prepolymer includes preferably the following steps:
mixing hydroxypropyl silicone oil with IPDI to conduct second prepolymerization to obtain the hydroxypropyl silicone oil-based isocyanate prepolymer.

In the present disclosure, the hydroxypropyl silicone oil has a weight-average molecular weight of preferably 1,000 to 2,000.

In the present disclosure, the hydroxypropyl silicone oil and the IPDI have a mass ratio of preferably (160-220):(65.4-112.4), more preferably 180:30.6.

In the present disclosure, the IPDI is preferably added dropwise at preferably 1.2 mL/min to 2.4 mL/min. The IPDI is preferably added dropwise under stirring and heating the hydroxypropyl silicone oil at preferably 50° C.±5° C.

In the present disclosure, the temperature and time of the second prepolymerization are preferably consistent with those of the first prepolymerization in the above technical solution, and are not repeated here.

In the present disclosure, when the polysiloxane-containing isocyanate prepolymer includes preferably a PPG-based isocyanate prepolymer and a hydroxypropyl silicone oil-based isocyanate prepolymer, the PPG-based isocyanate prepolymer and the hydroxypropyl silicone oil-based isocyanate prepolymer have a mass ratio of preferably (6-10):(0-4), more preferably 9:1 to 6:4, specifically preferably 9:1, 8:2, 7:3, or 6:4, and the hydroxypropyl silicone oil-based isocyanate prepolymer has a mass of not 0.

In the present disclosure, in the component A of the antifouling coating, a polydimethylsiloxane structure is introduced into the hydroxypropyl silicone oil-based isocyanate prepolymer. The polydimethylsiloxane structure can generate microphase separation with a polyurea hard segment and migrate to a surface of the coating, thereby reducing surface energy of the coating to reduce an adhesion between fouling organisms and an interface. A urea-based structure and redundant isocyanate groups that migrate to a bottom can increase the adhesion of the coating through hydrogen bonding and chemical bonding, ensuring cleaning and abrasion resistance.

In the present disclosure, the antifouling coating includes a component B, and the component B includes the following raw materials in parts by weight: 30 parts to 50 parts of polyaspartic acid ester and 1.5 parts to 4 parts of a polyaspartic acid powder.

In the present disclosure, the component B of the antifouling coating includes 30 parts to 50 parts, preferably 35 parts to 45 parts, more preferably 40 parts of the polyaspartic acid ester in parts by weight. In the present disclosure, polyaspartic acid ester is an isocyanate curing agent containing a secondary amine structure. An ester group and aliphatic properties in the polyaspartic acid ester can increase wear resistance of the coating. The polyaspartic acid ester is combined with a polyisocyanate-containing prepolymer in a component A to endow the antifouling coating with desirable toughness and elasticity, such that the antifouling coating has excellent impact and abrasion resistance.

In the present disclosure, based on a weight fraction of the component A, the component B of the antifouling coating includes 1.5 parts to 4 parts, preferably 2 parts to 3.5 parts, more preferably 2.5 parts to 3 parts of the polyaspartic acid powder. The polyaspartic acid powder has a weight-average molecular weight of preferably 2,000 to 5,000. The polyaspartic acid powder, as a polymer of aspartic acid, is negatively charged in a seawater environment, and can be released into seawater to interfere with the adhesion behavior of fouling organisms; meanwhile, the polyaspartic acid powder is natural and environmental-friendly, and does not cause harm to the marine environment.

In the present disclosure, based on a weight fraction of the component A, the component B of the antifouling coating further includes preferably 0.1 parts to 0.2 parts, more preferably 0.12 parts to 0.18 parts, more preferably 0.14 parts to 0.16 parts of a catalyst. The catalyst is preferably one or more selected from the group consisting of dibutyltin dilaurate, triethylamine, and zinc naphthenate. The catalyst can accelerate the reaction.

In the present disclosure, the component A and the component B have a weight ratio of (58-96):(31.6-54.2).

The present disclosure further provides a use method of the antifouling coating, including the following steps:
    mixing the component A with the component B to obtain the antifouling coating; and
    coating the antifouling coating on a substrate and conducting curing.

In the present disclosure, the component A is mixed with the component B to obtain the antifouling coating.

In the present disclosure, there is no special limitation on a preparation method of the component A and the component B, and a mixture preparation method well known to those skilled in the art can be used. There is no special limitation on an operation of mixing the component A and the component B, as long as the component A and the component B can be fully mixed.

In the present disclosure, after mixing the component A and the component B, an obtained mixed system is preferably subjected to defoaming; there is no special limitation on a defoaming operation, as long as the foam can be removed.

In the present disclosure, the antifouling coating is coated on a substrate and curing is conducted.

In the present disclosure, the substrate is prepared by preferably one or more selected from the group consisting of glass, steel, wood, bakelite, and plastic, more preferably the steel.

In the present disclosure, there is no special limitation on a coating thickness of the antifouling coating, which can be set according to actual conditions.

In the present disclosure, the curing is conducted at preferably 80° C.±2° C.; there is no special limitation on a curing time, as long as a dry film can be formed.

The present disclosure further provides use of the antifouling coating in the field of marine antifouling.

In the present disclosure, when the antifouling coating is applied to the marine antifouling, the antifouling coating is preferably coated on a surface of marine equipment. In the present disclosure, there is no special limitation on a coating thickness of the antifouling coating, which can be set according to actual conditions.

The antifouling coating and the use method and the use thereof provided by the present disclosure will be described in detail in connection with the following examples, but they should not be construed as limiting the protection scope of the present disclosure.

Example 1

An antifouling coating included a component A and a component B that were packaged separately, where the component A included an isocyanate prepolymer; and the isocyanate prepolymer included a PPG-based isocyanate prepolymer and a hydroxypropyl silicone oil-based isocyanate prepolymer;
    a preparation method of the PPG-based isocyanate prepolymer included the following steps: 240 parts by weight of dehydrated PPG (with a weight-average molecular weight of 3,000) was added into a reaction device, and 110 parts by weight of IPDI was added dropwise under stirring at 50° C.±5° C.; the above uniformly mixed reactants were reacted at 80° C. to 85° C. for 2.5 h to obtain the PPG-based isocyanate prepolymer.

A preparation method of the hydroxypropyl silicone oil-based isocyanate prepolymer included the following steps: 60 parts by weight of dehydrated hydroxypropyl polydimethylsiloxane (with a weight-average molecular weight of 2,000) was added into a reaction device, and 30.6 parts by weight of IPDI was added dropwise under stirring at 50° C.±5° C.; the above uniformly mixed reactants were reacted at 80° C. to 85° C. for 2.5 h to obtain the hydroxypropyl silicone oil-based isocyanate prepolymer.

The component B included the following raw materials in parts by weight: 5.2 parts of polyaspartic acid ester NH1220 and 0.25 parts of a polyaspartic acid powder at 2 kDa;

9 parts of the PPG-based isocyanate prepolymer and 1 part of the hydroxypropyl silicone oil-based isocyanate prepolymer were mixed evenly, added with 5.45 parts of the component B, a resulting mixture was mixed by stirring evenly, vacuum-defoamed, and then cured at 80° C.±2° C. to prepare samples.

According to GB/T25262, an abrasion weight loss rate of the obtained coating was tested; a wear resistance test was conducted with a coating wear tester at a rotating speed of a turntable set to 60 r/min and the number of revolutions of 500 r; an abrasion loss was represented by a ratio of a mass difference of the sample before and after the experiment to an original mass of the sample. As a result, the abrasion weight loss rate was 0.49%.

The elongation at break was a result of dividing a length after the tensile national standard test by an initial length. As a result, the elongation at break was 2976%.

Test of diatom adhesion inhibiting rate: a blank glass sheet was used as a control, the sample and the glass sheet were soaked in an Amphora solution at the same time, taken out after five days of cultivation, and a cardinal number was observed with a microscope, and then two sets of data were compared. As a result, the diatom adhesion inhibiting rate was 90%.

Example 2

This example differed from Example 1 in that: 8 parts of a PPG-based isocyanate prepolymer and 2 parts of a hydroxypropyl silicone oil-based isocyanate prepolymer were added.

A performance test was conducted according to the method of Example 1. As a result, the abrasion weight loss rate was 0.48%.

Example 3

This example differed from Example 1 in that: 7 parts of a PPG-based isocyanate prepolymer and 3 parts of a hydroxypropyl silicone oil-based isocyanate prepolymer were added.

A performance test was conducted according to the method of Example 1. As a result, the abrasion weight loss rate was 0.55%.

Example 4

This example differed from Example 1 in that: 6 parts of a PPG-based isocyanate prepolymer and 4 parts of a hydroxypropyl silicone oil-based isocyanate prepolymer were added.

A performance test was conducted according to the method of Example 1. As a result, the abrasion weight loss rate was 0.62%.

Example 5

This example differed from Example 1 in that: the component B included the following raw materials in parts by weight: 5.2 parts of polyaspartic acid ester NH1220 and 0.5 parts of a polyaspartic acid powder at 2 kDa.

A performance test was conducted according to the method of Example 1. As a result, the abrasion weight loss rate was 0.6%, the elongation at break was 2696%, and the diatom adhesion inhibiting rate was 92%.

Example 6

This example differed from Example 1 in that: the polyaspartic acid powder was at 5 kDa.

A performance test was conducted according to the method of Example 1. As a result, the abrasion weight loss rate was 0.37%, the elongation at break was 2859%, and the diatom adhesion inhibiting rate was 93%.

Example 7

This example differed from Example 3 in that: the polyaspartic acid powder was at 5 kDa.

7 parts of the PPG-based isocyanate prepolymer and 3 part of the hydroxypropyl silicone oil-based isocyanate prepolymer were mixed evenly, added with 5.45 parts of the component B, a resulting mixture was mixed by stirring evenly, vacuum-defoamed, and then cured at 80° C.±2° C. to prepare samples.

A performance test was conducted according to the method of Example 1. As a result, the abrasion weight loss rate was 0.22%, and the diatom adhesion inhibiting rate was 95%.

Example 8

This example differed from Example 1 in that: the component B included the following raw materials in parts by weight: 5.2 parts of polyaspartic acid ester NH1220 and 0.5 parts of a polyaspartic acid powder at 5 kDa.

A performance test was conducted according to the method of Example 1. As a result, the abrasion weight loss rate was 0.33%, the elongation at break was 2512%, and the diatom adhesion inhibiting rate was 94%.

Example 9

This example differed from Example 1 in that: the component B included the following raw materials in parts by weight: 5.2 parts of polyaspartic acid ester NH1220, 0.25 parts of a polyaspartic acid powder at 5 kDa, and 0.01 parts of a catalyst (dibutyltin dilaurate).

A performance test was conducted according to the method of Example 1. As a result, the abrasion weight loss rate was 0.38%, the elongation at break was 2859%, and the diatom adhesion inhibiting rate was 94.33%.

Comparative Example 1

An antifouling coating included a component A and a component B that were packaged separately, where the component A included an isocyanate prepolymer; and the isocyanate prepolymer was a PPG-based isocyanate prepolymer, with a preparation method the same as that in Example 1.

The component B included polyaspartic acid ester NH1220.

10 parts of the PPG-based isocyanate prepolymer and 5 parts of the component B were mixed by stirring evenly, a mixture was vacuum-defoamed, and then cured at 80° C.±2° C. to prepare samples.

A performance test was conducted according to the method of Example 1. As a result, the abrasion weight loss rate was 0.82%, the elongation at break was 3063%, and the diatom adhesion inhibiting rate was 65%.

Comparative Example 2

An antifouling coating included a component A and a component B that were packaged separately, where the component A included an isocyanate prepolymer; and the isocyanate prepolymer included a PPG-based isocyanate prepolymer and a hydroxypropyl silicone oil-based isocyanate prepolymer; preparation methods of the PPG-based isocyanate prepolymer and the hydroxypropyl silicone oil-based isocyanate prepolymer were the same as those in Example 1.

The component B included polyaspartic acid ester NH1220.

9 parts of the PPG-based isocyanate prepolymer and 1 part of the hydroxypropyl silicone oil-based isocyanate prepolymer were mixed evenly, added with 5.25 parts of the component B, a resulting mixture was mixed by stirring evenly, vacuum-defoamed, and then cured at 80° C.±2° C. to prepare samples.

A performance test was conducted according to the method of Example 1. As a result, the abrasion weight loss rate was 0.39%, the elongation at break was 2899%, and the diatom adhesion inhibiting rate was 87%.

Comparative Example 3

An antifouling coating included a component A and a component B that were separately packaged, where the component A included an isocyanate prepolymer, and the isocyanate prepolymer included a PPG-based isocyanate prepolymer and a hydroxypropyl silicone oil-based isocyanate prepolymer; preparation methods of the PPG-based isocyanate prepolymer and the hydroxypropyl silicone oil-based isocyanate prepolymer were the same as those in Example 1.

The component B included polyaspartic acid ester NH1220.

8 parts of the PPG-based isocyanate prepolymer and 2 part of the hydroxypropyl silicone oil-based isocyanate prepolymer were mixed evenly, added with 5.2 parts of the component B, a resulting mixture was mixed by stirring evenly, vacuum-defoamed, and then cured at 80° C.±2° C. to prepare samples.

A performance test was conducted according to the method of Example 1. As a result, the abrasion weight loss rate was 0.39%, the elongation at break was 1643%, and the diatom adhesion inhibiting rate was 89%.

Comparative Example 4

An antifouling coating included a component A and a component B that were separately packaged, where the component A included an isocyanate prepolymer, and the isocyanate prepolymer included a PPG-based isocyanate prepolymer and a hydroxypropyl silicone oil-based isocyanate prepolymer; preparation methods of the PPG-based isocyanate prepolymer and the hydroxypropyl silicone oil-based isocyanate prepolymer were the same as those in Example 1.

The component B included polyaspartic acid ester NH1220.

7 parts of the PPG-based isocyanate prepolymer and 3 part of the hydroxypropyl silicone oil-based isocyanate prepolymer were mixed evenly, added with 5.2 parts of the component B, a resulting mixture was mixed by stirring evenly, vacuum-defoamed, and then cured at 80° C.±2° C. to prepare samples.

A performance test was conducted according to the method of Example 1. As a result, the abrasion weight loss rate was 0.61%, the elongation at break was 1737%, and the diatom adhesion inhibiting rate was 94%.

Comparative Example 5

An antifouling coating included a component A and a component B that were separately packaged, where the component A included an isocyanate prepolymer, and the isocyanate prepolymer included a PPG-based isocyanate prepolymer and a hydroxypropyl silicone oil-based isocyanate prepolymer; preparation methods of the PPG-based isocyanate prepolymer and the hydroxypropyl silicone oil-based isocyanate prepolymer were the same as those in Example 1.

The component B included polyaspartic acid ester NH1220.

6 parts of the PPG-based isocyanate prepolymer and 4 part of the hydroxypropyl silicone oil-based isocyanate prepolymer were mixed evenly, added with 5.2 parts of the component B, a resulting mixture was mixed by stirring evenly, vacuum-defoamed, and then cured at 80° C.±2° C. to prepare samples.

A performance test was conducted according to the method of Example 1. As a result, the abrasion weight loss rate was 0.82%, the elongation at break was 268%, and the diatom adhesion inhibiting rate was 97%.

Comparative Example 6

An antifouling coating included a component A and a component B that were separately packaged, where the component A included an isocyanate prepolymer, and the isocyanate prepolymer included a PPG-based isocyanate prepolymer and a hydroxypropyl silicone oil-based isocyanate prepolymer; preparation methods of the PPG-based isocyanate prepolymer and the hydroxypropyl silicone oil-based isocyanate prepolymer were the same as those in Example 1.

The component B included the following raw materials in parts by weight: 6.3 parts of polyaspartic acid ester NH1420, and 0.1 parts of a catalyst (dibutyltin dilaurate);

10 parts of the PPG-based isocyanate prepolymer and 6.4 parts of the component B were mixed by stirring evenly, a mixture was vacuum-defoamed, and cured at 80° C.±2° C. to prepare samples.

A performance test was conducted according to the method of Example 1. As a result, the abrasion weight loss rate was 0.65%, the elongation at break was 243%, and the diatom adhesion inhibiting rate was 64%.

Comparative Example 7

An antifouling coating included a component A and a component B that were separately packaged, where the component A included an isocyanate prepolymer, and the isocyanate prepolymer included a PPG-based isocyanate prepolymer and a hydroxypropyl silicone oil-based isocyanate prepolymer; preparation methods of the PPG-based isocyanate prepolymer and the hydroxypropyl silicone oil-based isocyanate prepolymer were the same as those in Example 1.

The component B included the following raw materials in parts by weight: 6.3 parts of polyaspartic acid ester NH1420, and 0.1 parts of a catalyst (dibutyltin dilaurate);

8 parts of the PPG-based isocyanate prepolymer and 2 part of the hydroxypropyl silicone oil-based isocyanate prepolymer were mixed evenly, added with 6.4 parts of the component B, a resulting mixture was mixed by stirring evenly, vacuum-defoamed, and then cured at 80° C.±2° C. to prepare samples.

A performance test was conducted according to the method of Example 1. As a result, the abrasion weight loss rate was 0.8%, and the diatom adhesion inhibiting rate was 85%.

Comparative Example 8

An antifouling coating included a component A and a component B, where the component A included an isocyanate prepolymer, and the isocyanate prepolymer included a PPG-based isocyanate prepolymer and a hydroxypropyl silicone oil-based isocyanate prepolymer; preparation methods of the PPG-based isocyanate prepolymer and the hydroxypropyl silicone oil-based isocyanate prepolymer were the same as those in Example 1.

The component B included the following raw materials in parts by weight: 6.3 parts of polyaspartic acid ester NH1420, and 0.1 parts of a catalyst (dibutyltin dilaurate);

6 parts of the PPG-based isocyanate prepolymer and 4 part of the hydroxypropyl silicone oil-based isocyanate prepolymer were mixed evenly, added with 6.4 parts of the component B, a resulting mixture was mixed by stirring evenly, vacuum-defoamed, and then cured at 80° C.±2° C. to prepare samples.

A performance test was conducted according to the method of Example 1. As a result, the abrasion weight loss rate was 1.92%, and the diatom adhesion inhibiting rate was 85%.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:
1. An antifouling coating, comprising a component A and a component B that are separately packaged; wherein
the component A comprises an isocyanate prepolymer; and the isocyanate prepolymer comprises a polypropylene glycol (PPG)-based isocyanate prepolymer and a hydroxypropyl silicone oil-based isocyanate prepolymer;
the component B comprises the following raw materials in parts by weight: 30 parts to 50 parts of polyaspartic acid ester and 1.5 parts to 4 parts of a polyaspartic acid powder; and
the component A and the component B have a weight ratio of (58-96):(31.6-54.2).

2. The antifouling coating according to claim 1, wherein a preparation method of the PPG-based isocyanate prepolymer comprises the following steps:
mixing PPG with isophorone diisocyanate (IPDI) to conduct first prepolymerization to obtain the PPG-based isocyanate prepolymer; wherein
the PPG and the IPDI have a mass ratio of (180-300):(65.1-137.9); and
the PPG has a weight-average molecular weight of 2,000 to 3,000.

3. The antifouling coating according to claim 2, wherein the first prepolymerization is conducted at 80° C. to 85° C. for 2 h to 3 h.

4. The antifouling coating according to claim 1, wherein a preparation method of the hydroxypropyl silicone oil-based isocyanate prepolymer comprises the following steps:
mixing hydroxypropyl silicone oil with IPDI to conduct second prepolymerization to obtain the hydroxypropyl silicone oil-based isocyanate prepolymer; wherein
the hydroxypropyl silicone oil and the IPDI have a mass ratio of (160-220):(65.4-112.4); and the hydroxypropyl silicone oil has a weight-average molecular weight of 1,000 to 2,000.

5. The antifouling coating according to claim 4, wherein the second prepolymerization is conducted at 80° C. to 85° C. for 2 h to 3 h.

6. The antifouling coating according to claim 1, wherein the PPG-based isocyanate prepolymer and the hydroxypropyl silicone oil-based isocyanate prepolymer have a mass ratio of (6-10):(0-4), and the hydroxypropyl silicone oil-based isocyanate prepolymer has a mass of not 0.

7. The antifouling coating according to claim 2, wherein the PPG-based isocyanate prepolymer and the hydroxypropyl silicone oil-based isocyanate prepolymer have a mass ratio of (6-10):(0-4), and the hydroxypropyl silicone oil-based isocyanate prepolymer has a mass of not 0.

8. The antifouling coating according to claim 3, wherein the PPG-based isocyanate prepolymer and the hydroxypropyl silicone oil-based isocyanate prepolymer have a mass ratio of (6-10):(0-4), and the hydroxypropyl silicone oil-based isocyanate prepolymer has a mass of not 0.

9. The antifouling coating according to claim 4, wherein the PPG-based isocyanate prepolymer and the hydroxypropyl silicone oil-based isocyanate prepolymer have a mass ratio of (6-10):(0-4), and the hydroxypropyl silicone oil-based isocyanate prepolymer has a mass of not 0.

10. The antifouling coating according to claim 5, wherein the PPG-based isocyanate prepolymer and the hydroxypropyl silicone oil-based isocyanate prepolymer have a mass ratio of (6-10):(0-4), and the hydroxypropyl silicone oil-based isocyanate prepolymer has a mass of not 0.

11. The antifouling coating according to claim 6, wherein the PPG-based isocyanate prepolymer and the hydroxypropyl silicone oil-based isocyanate prepolymer have a mass ratio of 9:1 to 6:4.

12. The antifouling coating according to claim 7, wherein the PPG-based isocyanate prepolymer and the hydroxypropyl silicone oil-based isocyanate prepolymer have a mass ratio of 9:1 to 6:4.

13. The antifouling coating according to claim 8, wherein the PPG-based isocyanate prepolymer and the hydroxypropyl silicone oil-based isocyanate prepolymer have a mass ratio of 9:1 to 6:4.

14. The antifouling coating according to claim 1, wherein the polyaspartic acid powder has a weight-average molecular weight of 2,000 to 5,000.

15. The antifouling coating according to claim 1, wherein the component B further comprises a catalyst, and the catalyst is one or more selected from the group consisting of dibutyltin dilaurate, triethylamine, and zinc naphthenate.

16. The antifouling coating according to claim 15, wherein 0.1 parts by weight to 0.2 parts by weight of the catalyst is used.

17. A use method of the antifouling coating according to claim 1, comprising the following steps:
mixing the component A with the component B to obtain the antifouling coating; and
coating the antifouling coating on a substrate and conducting curing.

18. The use method according to claim 17, wherein the substrate is prepared by one or more selected from the group consisting of glass, steel, wood, bakelite, and plastic.

19. The use method according to claim 17, wherein the curing is conducted at 80° C.±2° C.

20. The antifouling coating according to claim 1, wherein the antifouling coating is used in the field of marine antifouling.

* * * * *